United States Patent
Park et al.

(10) Patent No.: US 11,738,600 B2
(45) Date of Patent: Aug. 29, 2023

(54) STEEL CORD FOR RUBBER ENHANCEMENT AND MANUFACTURING METHOD THEREFOR

(71) Applicant: TREFIL ARBED KOREA CO., LTD, Yangsan-si (KR)

(72) Inventors: Pyeong Yeol Park, Pohang-si (KR); Hong Ki Kim, Pohang-si (KR); Dong Kil Lee, Pohang-si (KR); Sang Ho Kim, Pohang-si (KR)

(73) Assignee: Trefil Arbed Korea Co. LTD, Yangsan-Si (KR)

(*) Notice: Subject to any disclaimer, the term of this patent is extended or adjusted under 35 U.S.C. 154(b) by 0 days.

(21) Appl. No.: 16/966,685

(22) PCT Filed: Apr. 25, 2019

(86) PCT No.: PCT/KR2019/004986
§ 371 (c)(1),
(2) Date: Jul. 31, 2020

(87) PCT Pub. No.: WO2020/218640
PCT Pub. Date: Oct. 29, 2020

(65) Prior Publication Data
US 2021/0237513 A1  Aug. 5, 2021

(51) Int. Cl.
*B60C 9/00* (2006.01)
*C25D 5/50* (2006.01)
(Continued)

(52) U.S. Cl.
CPC .......... *B60C 9/0007* (2013.01); *B32B 15/015* (2013.01); *C25D 5/10* (2013.01);
(Continued)

(58) Field of Classification Search
CPC .......... B60C 9/0007; B60C 2009/0014; B60C 9/0014; B32B 15/015; B32B 15/01;
(Continued)

(56) References Cited

U.S. PATENT DOCUMENTS

| 4,978,586 A | * | 12/1990 | Chambaere | .......... D07B 1/0666 |
| | | | | 428/625 |
| 6,059,951 A | * | 5/2000 | Orjela | ...................... B29B 15/08 |
| | | | | 205/141 |

(Continued)

FOREIGN PATENT DOCUMENTS

| CN | 103814159 A | * | 5/2014 | .......... B60C 9/0007 |
| GB | 2076320 A | * | 12/1981 | .......... B21C 37/042 |

(Continued)

*Primary Examiner* — Adam Krupicka
(74) *Attorney, Agent, or Firm* — DeLio Peterson & Curcio LLC; Brian G. Schlosser

(57) ABSTRACT

The steel wire for the steel cord of the present invention includes a plating layer of Cu-M-Zn (M is one or two elements of Co, Ni, Cr, Mo, Al, In, or Sn) and has a concentration gradient in which the M content ratio in a region from the surface to ¼ of the plating layer is 40% or more compared with the M content ratio in the entire region of the plating layer, and the steel cord for rubber reinforcement is obtained by a manufacturing method comprising: performing sequential plating on a surface of a steel wire in the order of Cu→M→Zn; performing a primary diffusion, for concentration gradient of M, by subjecting the sequentially plated steel wire to high-frequency induction heating using 1-500 MHz; and performing a secondary diffusion, following the primary diffusion, by medium-frequency induction heating using 10-500 KHz.

4 Claims, 4 Drawing Sheets

(51) Int. Cl.
*B32B 15/01* (2006.01)
*C25D 5/10* (2006.01)
*D07B 1/06* (2006.01)

(52) U.S. Cl.
CPC .............. *C25D 5/50* (2013.01); *D07B 1/066* (2013.01); *D07B 1/0646* (2013.01); *B60C 2009/0014* (2013.01); *D07B 2501/2046* (2013.01)

(58) Field of Classification Search
CPC .......... C25D 5/10; C25D 5/50; D07B 1/0646; D07B 1/066; D07B 2501/2046; D07B 2801/18; D07B 2201/201; D07B 2201/2043; Y10T 428/12458
USPC ........................................................ 428/610
See application file for complete search history.

(56) References Cited

U.S. PATENT DOCUMENTS

| | | | | |
|---|---|---|---|---|
| 6,203,932 B1* | 3/2001 | Hisakatu | .................. | B21C 1/00 |
| | | | | 152/556 |
| 2002/0088522 A1* | 7/2002 | Uchino | ................ | C08K 5/3415 |
| | | | | 152/537 |
| 2007/0040303 A1* | 2/2007 | Miyazaki | ............ | B29C 35/0288 |
| | | | | 152/565 |
| 2014/0315044 A1* | 10/2014 | Shizuku | ................... | C25D 5/48 |
| | | | | 428/684 |
| 2015/0017467 A1* | 1/2015 | Buytaert | ............... | C22C 38/001 |
| | | | | 428/625 |
| 2016/0130750 A1* | 5/2016 | Song | .................... | C10M 139/00 |
| | | | | 428/677 |
| 2020/0338928 A1* | 10/2020 | Nakajima | ................ | C25D 5/36 |

FOREIGN PATENT DOCUMENTS

| | | | | |
|---|---|---|---|---|
| JP | 2000178774 A | | 6/2000 | |
| JP | 4744672 B2 | | 5/2011 | |
| JP | 2011219837 A | * | 11/2011 | .......... D07B 1/0666 |
| JP | 2014019974 A | | 2/2014 | |
| KR | 1020000042609 A | | 7/2000 | |
| KR | 101775741 B1 | | 9/2017 | |
| KR | 1020190056703 A | | 5/2019 | |
| WO | WO-2011076746 A1 | * | 6/2011 | ............... D07B 1/06 |

* cited by examiner

STEEL CORD FOR RUBBER ENHANCEMENT AND MANUFACTURING METHOD THEREFOR

TECHNICAL FIELD

The present invention relates to a steel cord for rubber reinforcement buried in a rubber product, such as a tire, and more particularly, to a steel cord for rubber reinforcement and a manufacturing method therefor, wherein a third alloy element is added to a brass plating layer such that the third alloy element has a concentration gradient from the surface of the plating layer, thereby significantly enhancing adhesiveness to rubber, especially damp-heat aging adhesion.

BACKGROUND ART

A steel cord is buried in a vehicle tire and used for rubber reinforcement, and a brass plating layer is formed on the surface of the steel cord to have an improved adhesiveness with a tire rubber. Such a steel wire having a brass plating layer formed thereon is buried in a tire such that the steel wire is a single body or in a stranded state of several strands, to thereby reinforce the tire.

Meanwhile, the adhesion between a brass plated steel wire and a tire rubber is gradually reduced due to various factors as time passes as compared with the adhesion at the early stage of vulcanization, and representative factors of adhesion reduction may be extreme heat and moisture applied to tires while a vehicle is driven.

First, regarding the heat due the driving of the vehicle, as the temperature of the tire increases during the high-speed driving of the vehicle, the sulfur that has not been fully vulcanized in the early stage of vulcanization becomes vulcanized, so that the tires have an increased hardness and thus lose the elasticity of rubber itself, causing fatigue degradation due to consecutive impacts from the road and the weight of the vehicle. In addition, the heat generated during driving induces an adhesion reaction between brass and rubber to continuously grow a copper sulfide layer that was generated at the early stage of vulcanization. The copper sulfide layer grown to an appropriate thickness or more is easily fractured from the brass layer by the impact applied to the tires, causing the deterioration in adhesion.

Next, regarding the dampness, when the tire rubber is damaged, the moisture penetrates into the tire rubber along a damaged site, causing chemical decomposition and corrosion around the steel wire cord, which is accompanied by a sharp drop in the initial adhesion generated at the time of vulcanization.

Accordingly, in order to extend the lifespan of tires reinforced by a steel cord, it is important to have as much high damp-heat aging adhesion as the high initial adhesion between a plated steel wire and a tire rubber.

In order to improve heat-resistant (corrosion-resistant) adhesiveness and moisture-resistant adhesiveness as important quality characteristics required for the steel cord, cobalt is known to contribute to an enhancement in the adhesion between rubber and a steel wire may be added to a rubber compound, or a cobalt element may be added to the brass constituting the surface of a steel wire to form a plating layer of a ternary or quaternary alloy.

However, the addition of a cobalt complex to the rubber compound has a harmful action on the rubber since cobalt is an oxidation catalyst like most transition metals. That is, the cobalt in the rubber is known to accelerate the oxidation of diene rubber molecules to cause pre-aging of the rubber as well as accelerate the cracking rate of the rubber.

In addition, the cobalt that substantially exerts an effective role as an accelerator for an adhesion reaction with a steel cord is restricted to about 20% or less of cobalt, which is present in a region adjacent to the steel cord, out of the overall content of cobalt added to the rubber, and thus relatively expensive cobalt is added more than necessary, causing high manufacturing costs.

Moreover, due to environmental problems that cobalt elutes as a heavy metal to cause environmental pollution when tires containing cobalt in rubber are discarded at the end of their life, the regulations on the use of cobalt in tires have been recently emerging. In order to solve the problems, tire manufacturers are required to develop a cobalt-free compound for a tire, and the development of techniques in which a special plating treatment for adhesion compensation is performed on the plating layer of the steel cord so as to secure the adhesion between the steel cord and the cobalt-free compound has been attempted.

As for techniques that were developed to secure the adhesion between the cobalt-free compound for a tire and the steel cord, Korean Patent Publication No. 1993-0013214 and Japanese Patent Publication No. 2003-171883 disclose that the corrosion-resistant and moisture-resistant adhesiveness of the steel cord is improved by simply applying a cobalt compound on the surface of a brass plated steel wire during the drawing or stranding of the brass plated steel wire. However, the cobalt compound simply coated on the surface of the steel cord (plated steel wire) does not form strong bonding strength with a brass layer, thus merely preventing the deterioration of moisture-resistant adhesiveness to only rubber rather than affecting the adhesive interface layer between brass and rubber, so that the cobalt compound is known to be not highly effective in practice.

In addition, Korean Patent Publication No. 2001-0003864 and No. 2008-0072700 disclose a method wherein a separate lubrication bath in which a cobalt compound is dissolved is installed outside an exit of a drawing bath at the time of drawing, so the cobalt compound, which has been coated onto the surface of the brass plated steel wire passing through the lubrication bath, passes through a final die to form a ternary alloy containing brass-cobalt on the surface of the brass plating layer, thereby improving corrosion-resistant and moisture-resistant adhesiveness. However, the above method can be expected to produce the above-described effects in the production of small quantities or in cases of some of the ternary alloy plated steels at the early stage, but as the production volume increases, i.e., as the operation time of the lubrication bath elapses, the friction between the die and the steel wire inside the lubrication bath may be increased, and the high heat generated in the die may increase the temperature of the lubricating fluid in the lubrication bath, resulting in a sharp deterioration in drawability, thereby causing serious wire defects on the surface of the steel wire, or wire disconnection, after drawing.

Moreover, in the above method, the cobalt component bonded to the surface of the steel cord has a high concentration of several ppm or more, and such a high concentration of cobalt is not a problem in the production of small quantities of products, but in the mass production, the friction between the cobalt used as an adhesive material during the sintering of nibs inside the die used in the drawing and the cobalt contained in the lubricant increases a breakage of the die, and the nip pieces of the die that are broken off are caught in the entrance of a subsequent die to cause defects on the wire surface of the drawn wire, increasing the breakage of the wire on the surface defects when the torsional stress is applied by torsion in the subsequent stranding process of stranding steel wires, resulting in the deterioration in production.

Meanwhile, Korean Patent Publication No. 1995-0000929 discloses a method wherein the surface of a steel wire is sequentially plated with copper, zinc, (nickel), and cobalt, and subjected to a diffusion process, thereby obtaining a plating layer composed of a ternary or quaternary alloy of Cu—Zn—(Ni)—Co. However, such a method has not been brought to practical use since the sequential plating process has a problem in that due to the difference in the ionization tendency of metal elements, the Cu and Zn plating layers obtained by earlier plating are dissolved by a substitution reaction when immersed in a plating solution for plating a third element, such as Co.

DETAILED DESCRIPTION OF THE INVENTION

Technical Problem

The present invention has been made to solve the above problems occurring in the prior art, and an aspect of the present invention is to provide a steel cord for rubber reinforcement, including a ternary or quaternary alloy plated steel wire, wherein the steel wire is configured to have a concentration gradient in which a third element, such as Co, constituting the plating layer of the steel cord is relatively concentrated in a surface portion in the plating layer, thereby contributing as much as possible to an enhancement in adhesion with rubber, especially, an enhancement in aging adhesion, showing excellent drawing workability, and minimizing environmental problems occurring when tire products are discarded after use.

Another aspect of the present invention is to provide a method for manufacturing the steel cord for rubber reinforcement, wherein a third element in the plating layer has a concentration gradient from the surface of the plating layer by using the order of sequential plating, the frequency adjustment in thermal diffusion processes, and the Kirkendall effect resulting from the difference in diffusion rate between respective elements.

Technical Solution

In accordance with an aspect of the present invention, there is provided a steel cord for rubber reinforcement, including at least one strand of a plated steel wire, wherein the steel wire includes a plating layer of Cu-M-Zn (M is one or two elements of Co, Ni, Cr, Mo, Al, In, or Sn) and has a concentration gradient in which the M content ratio in a region from the surface to ¼ of the plating layer is 40% or more compared with the M content ratio in the entire region of the plating layer.

According to a technical feature of the present invention, the plated steel wire for the steel cord may have a concentration gradient in which the M content ratio in a region from the surface to ½ of the plating layer is 20% or more compared with the M content ratio in the entire region of the plating layer.

According to another technical feature of the present invention, when the M content ratio in the entire region of the plating layer and the M content ratio in the region from the surface to ¼ of the plating layer in the plated steel wire for the steel cord are expressed by a relational expression, the slope of the trend line may be 1.4 or greater.

According to another technical feature of the present invention, when the M content ratio in the entire region of the plating layer and the M content ratio in the region from the surface to ½ of the plating layer in the plated steel wire for the steel cord are expressed by a relational expression, the slope of the trend line may be 1.2 or greater.

In the plating layer of the plated steel wire for the steel cord of the present invention, the total content of M is preferably 0.5-20 wt %, and the proportion of Cu in Cu and Zn excluding M is preferably 60-70 wt %.

In the plated steel wire for the steel cord of the present invention, the average thickness of the entire region of the plating layer is preferably 0.1-0.4 μm; the diameter of a steel wire filament is preferably 0.1-0.4 mm; and the ZnO content in the surface of the plating layer is preferably 35-50 mg/m².

When a steel wire for the steel cord according to the present invention has a concentration gradient in which the M content ratio in a region from the surface to ¼ of the plating layer of Cu-M-Zn is less than 40% compared with the M content ratio in the entire region of the plating layer, the effect of improving adhesiveness to rubber, to be obtained through alloying of the third element (M), is insignificant, and thus the effects of enhancing damp-heat aging adhesion and drawability cannot be expected. Therefore, the concentration gradient is preferably configured such that the M content ratio is 40% or more compared with the M content ratio in the entire region of the plating layer.

The steel cord for rubber enhancement of the present invention is manufactured by including: performing sequential plating on a surface of a steel wire in the order of Cu→M→Zn; performing a primary diffusion, for concentration gradient of M, by subjecting the sequentially plated steel wire to high-frequency induction heating using 1-500 MHz; and performing a secondary diffusion, following the primary diffusion, by medium-frequency induction heating using 10-500 KHz.

Usually, when dissimilar metals are alloyed through reactions therebetween, substitutional alloys formed through site exchanges in the crystal lattice are mainly generated. Accordingly, in the present invention, in the selection of a third element (M) added for improving adhesiveness to rubber in addition to copper and zinc constituting conventional brass plating, an element having a similar atomic size to copper and zinc are preferentially targeted. As an element having a similar atomic size to copper and zinc while contributing to the improvement in adhesiveness with rubber, cobalt (Co), nickel (Ni), chromium (Cr), molybdenum (Mo), aluminum (Al), indium (In), or tin (Sn) can be used, and out of these elements, cobalt is observed to greatly contribute to an improvement in adhesiveness to rubber and wire drawability.

The steel wire for the steel cord of the present invention has a concentration gradient in which in the plating layer of Cu-M-Zn, the content of M as a third element is drastically decreased toward the inside from the surface, in other words, a high content of M is maintained in the surface portion of the plating layer. In order to provide such a concentration gradient, in the present invention, electroplating is carried out in the order of Cu→M→Zn considering the ionization tendency of metal elements, and then the heat treatment is carried out twice using induction heating systems using different frequencies, thereby adjusting the diffusion direction and rate of the third element (M) according to differences in diffusion coefficient and differences in electronegativity between respective elements, so that a concentration gradient in which the third element is relatively concentrated in the surface of the plating layer is obtained.

The induction heating used to heat metals is due to electromagnetic induction, and a conductor, such as a metal, located in a coil flowing alternating (high frequency) currents therethrough generates heat by resistances of the eddy current loss and hysteresis loss. Heating a material to be heated using the heat energy thus generated is called induction heating, and especially, induction heating using high-frequency current is called high-frequency induction heating. A high-frequency alternating current through the coil generates an alternating magnetic flux by an alternating current around the coil, and an induction current is generated in the conductor placed in this magnetic field. This current is called an eddy current. Joule heat is generated by the inherent resistance of the material to be heated and the eddy current, and such Joule heat is called an eddy current loss. The eddy current loss is a heat source of induction heating. Such induction heating is restricted to conductors, and application techniques need to be used for other non-conductors. Out of the conductors, a magnetic substance, especially, iron, may cause an electrical loss due to magnetization, called a hysteresis loss in addition to the eddy current loss, and thus facilitate heating and have better heating efficiency than nonferrous metals.

On the other hand, when an alternating current flows through a conductor, the current density decreases at the center of the conductor, and thus most current flows intensively on the surface of the conductor, and such a tendency is called a skin phenomenon or a skin effect. The reason is that toward the center of the conductor, more flux linkages are generated to increase the inductance, thereby making an alternating current difficult to flow.

The skin phenomenon is determined by frequency and a material, and the depth of a heated region is expressed by the following equation:

$$\delta = 5.033 \sqrt{\frac{\rho}{\mu s \cdot f}} \text{ [(cm)]}$$

δ=current penetration depth, ρ=inherent resistance of material (μΩ·cm), f=frequency (Hz), μs=relative permeability In the equation, the current penetration depth (δ) is the depth wherein 90% of power is concentrated on a region from the surface to δ, and in cases of the same material, the higher the frequency, the smaller the penetration depth, and thus heating is concentrated near the surface.

Therefore, in the present invention, when a plating layer is formed on a steel wire by using the skin effect, sequential plating is carried out in the order of Cu→M→Zn, and then two-stage diffusion was carried out by performing high-frequency induction heating using 1-500 MHz to induce primary diffusion in only an M-Zn layer and performing medium-frequency induction heating using 10-500 KHz to thermally diffuse the entire Cu-M-Zn plating layer, so that a steel wire for a steel cord is obtained that has a concentration gradient in which the M element is relatively more distributed in the surface portion of the plating layer and the content of the M element is less toward the inside thereof.

In addition, the diffusion rate of a metal is greatly affected by diffusion temperature, diffusion time, diffusion coefficient of the metal, and the diffusion rate of each metal element can be expressed by the following equation:

$$D = D_0 \text{EXP}\left(\frac{-Q}{RT}\right)$$

D: diffusion rate (V/sec), $D_0$: diffusion coefficient, Q: activation energy, R: gas constant, T: absolute temperature In general, the diffusion rate of Zn is much higher than the diffusion rate of Cu, and the M element located between the zinc layer and the copper layer as plating layers fast diffuses toward Zn in the surface, and as a result of such directional diffusion, a concentration gradient can be formed such that the M element is more distributed in the outer surface of the plating layer and relatively less distributed in the inside of the plating layer close to substrate steel.

Meanwhile, respective elements are different in view of nuclear charges and electron configuration, and thus have different electron-attracting forces when bonding with the atom of another element. Such an extent of electron attraction is called electronegativity. Electronegativity and electron affinity have different meanings, and the latter corresponds to an energy term used for a single atom. When the same atoms are bonded to each other, like the H2 molecule, the two atoms have the same scale of electronegativity. Then both atoms have the same capacity to attract a shared pair of electrons and thus share the pair of electrons equally and the pair of electrons is uniformly present near the nuclei of the respective hydrogen atoms.

When two atoms with different scales of electronegativity are bonded to each other, a pair of electrons is highly likely to be in the vicinity of the element with a larger scale of electronegativity. In a case of the HCl molecule, chlorine is more electronegative than hydrogen, and thus the bonding electron pair of H–지 is highly likely to be in the vicinity of chlorine rather than hydrogen. This means that the Cl atom is partially negatively charged and the H atom is partially positively charged. As such, positive and negative charges with the same size separated from each other at a certain distance in a molecule are called a dipole. The HCl molecule is a dipole having the center between the positive charge and the negative charge, and has polarity. A molecule consisting of two atoms with different scales of electronegativity has polarity.

The intensity of the dipole is calculated by multiplying the distance between the charges of the dipole, that is, the dipole moment. Highly polar molecules have a large dipole moment and non-polar molecules have no dipole moment. A molecule with bonds among three or more atoms has a polar bond, but may be a non-polar molecule in terms of energy. Carbon dioxide corresponds to such a case. The $CO_2$ molecule is linear, and has polarity since oxygen is more electronegative than carbon. However, the moment of the whole molecule is the sum of respective dipole moments in the molecule, and is calculated as a vector value. As for $CO_2$, the bond dipoles are completely in opposite directions and thus completely offset each other, resulting in a molecule moment of zero, and therefore, the $CO_2$ seems to have non-polar properties. While, the water ($H_2O$) molecule has a bent shape, and thus the two dipoles are not offset but are rather partially added. As a result, the $H_2O$ molecule substantially has a polarity with a dipole moment.

As for the measurement of electronegativity, a measurement method using molecular binding energy is most widely known. A molecule formed by bonding of two atoms with different scales of electronegativity has more energy than expected. The strength of this bonding is obtained by the covalent energy between atoms plus the attraction between charges with opposite signs at both ends of the bonded intermolecular dipoles. Therefore, extra bonding force is due to this intermolecular attraction, and such a concept is used to enable the measurement of electronegativity of each element. Meanwhile, the electronegativity of each element is not important, but the difference in electronegativity between two bonded atoms is rather important. Therefore, a small difference in electronegativity results in a bond with comparatively small polarity and a large difference in electronegativity results in a bond with comparatively large polarity, so that most of electron pairs are present around the atom with larger electronegativity.

Such a difference in electronegativity can be utilized to enable alloying through the addition of a metal ion having similar electronegativity to Cu and Zn. The bonding between metals with similar scales of electronegativity can be used to obtain a steel wire for a steel cord, having a concentration gradient of a third element (M) according to the depth from the surface of the plating layer.

When the steel cord actually adheres to the rubber, a reaction occurs at the region of ¼ or ½ depth of the plating layer of the steel wire. Therefore, as the third element for adhesion enhancement is more distributed in the surface side of the plating layer, the enhancement effect can be increased and the drawing workability can be improved.

When cobalt is used as a third element in the plating layer of a ternary or quaternary alloy in a steel wire for a steel cord, cobalt is present in the form of an interstitial cation inside the ZnO oxide layer of the plating layer, thereby increasing the amount of positive charges in the oxide layer, and Co, instead of Zn, first induces an oxidation reaction with the moisture penetrating into the inside at the time of aging, especially, damp-heat aging, in the steel cord adhering to the rubber, thereby contributing to adhesion enhancement through the suppression of dezincification.

Advantageous Effects

The steel cord for rubber reinforcement according to the present invention has enhanced adhesion, especially, aging adhesion with rubber by cobalt present in a relatively high content in the surface portion of the alloy layer of the steel wire constituting the steel cord, thereby improving durability of tire products.

Furthermore, the cobalt contained in the plating layer of the steel wire for the steel cord can exhibit adhesive characteristics in substitution for a role of an existing cobalt compound contained in the tire rubber to enhance adhesion, and thus a tire causing neither environmental problems nor any deterioration in drawing processability can be developed.

MODE FOR CARRYING OUT THE INVENTION

The manufacturing method including the above-described objects and technical features of the present invention can be understood more detail through the following examples. The present examples are included in desirable examples provided for understanding of the present invention, and the protection scope of the present invention is not limited or restricted by the examples.

Figure 1:
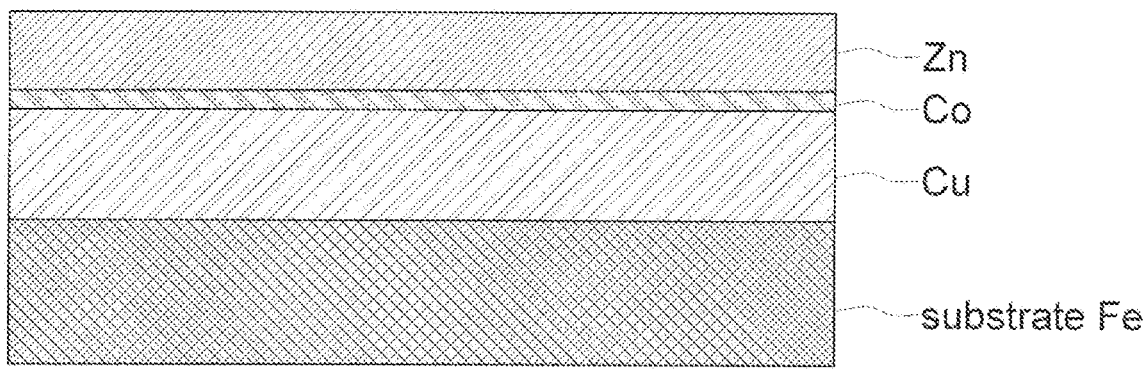
FIG. 1 is a cross-sectional view of a ternary alloy plating layer of a steel wire for a steel cord according to the present invention.

First, a steel wire for a steel cord, having a wire diameter of 1.75 mm, was prepared. The surface of the steel wire was subjected to sequential plating in the order of Cu→M→Zn to form a ternary alloy plating layer having a section as shown in FIG. 1. Co as a third element was used in a varied content within a range of 1-20%. A plurality of samples of examples and comparative examples shown in Table 1 below were prepared by varying the contents of three alloy elements constituting the plating layer.

In order to investigate the adhesive characteristics and drawing workability behavior according to the Co content and the concentration gradient in the surface portion, the samples were subjected to induction heating diffusion. In order to give a concentration gradient of Co to the plating layer of each sample, each sample was subjected to induction heating diffusion twice using different frequencies by using a skin effect of the inductive heating diffusion.

First, primary induction heating was carried out using a high frequency of 500 MHz such that diffusion occurs in the surface of the plating layer, that is, only a Co—Zn plating layer, and then secondary induction heating was carried out using a medium frequency of 30 KHz such that diffusion occurs in the entire region of the plating layer, that is, a Cu—Co—Zn plating layer. The measured diffusion temperature of the plating layer was 420° C. and the diffusion time was 5 s for the primary induction heating and 10 s for the secondary induction heating, so that a concentration gradient with respect to the Co content ratio was configured such that the Co content ratio was high in the surface portion of the plating layer and the Co content ratio was reduced closer to the substrate steel.

In Table 1 below, the sample of Comparative Example 1 was a conventional brass plated steel wire containing no Co, and was prepared to compare adhesion with ternary alloy plating layers containing Co. The sample of Comparative Example 2 was prepared to investigate whether the concentration gradient of the Co metal element is obtained by high-frequency diffusion. Sequential plating of Cu—Co—Zn was carried out such that the Co content was 5 wt %, and then only primary induction heating was carried out using a medium frequency of 30 KHz while the diffusion temperature was 420° C. and the diffusion time was 15 s.

The 1.75 mm-diameter samples obtained through such a procedure were drawn into a diameter of 0.3 mm through wet drawing, and thereafter, three wire strands of the same steel wire sample were joined to manufacture a 3×0.30 steel cord.

In order to investigate the Co %, Cu %, and adhesive amount in the plating layer of a steel wire for a steel cord, ICP was used, and in order to analyze the Co % in regions from the surface to ¼ and ½ of the plating layer, each plated wire was immersed in a 25% brass striper solution for a calculated time, to dissolve a portion of the surface of the plating layer, wherein the time for immersion was obtained from the following calculation equation. In addition, the Co content at each position was analyzed to check a concentration gradient.

(1) The time for immersion to dissolve a region from the surface to ¼ of the plating layer (s)=CW/4*(80.186*D− 21.862)

(1) The time for immersion to dissolve a region from the surface to ½ of the plating layer (s)=CW/2*(80.186*D− 21.862)

* C/W: total plating adhesive amount (g/kg), D: wire diameter (mm)

The plated steel wire samples obtained from the manufacturing process were subjected to wet drawing to evaluate drawing workability, and rubber products having steel cords embedded therein manufactured using these steel wire samples were evaluated for initial and damp-heat aging adhesiveness according to the Co content change.

TABLE 1

| Classification | | Comparative Example 1 | Comparative Example 2 | Example 1 | Example 2 | Example 3 | Example 4 | Example 5 | Example 6 |
|---|---|---|---|---|---|---|---|---|---|
| Induction frequency heating | Primary | 30 KHz | 30 KHz | 5000 MHz | 500 MHz | 500 MHz | 500 MHz | 500 MHz | 500 MHz |
| | Secondary | — | — | 30 KHz | 30 KHz | 30 KHz | 30 KHz | 30 KHz | 30 KHz |
| Cu/(Cu + Zn) | | 62 | 62 | 62 | 62 | 62 | 62 | 62 | 62 |
| Zn/(Cu + Zn) | | 38 | 38 | 38 | 38 | 38 | 38 | 38 | 38 |
| Co/ (Cu+ Zn + Co) | Co in entire layer | — | 5 | 1 | 3 | 5 | 7 | 10 | 20 |
| | Co in region from surface to ¼ | — | 5 | 1.4 | 4.2 | 7 | 9.8 | 14 | 28 |
| | Co in region from surface to ½ | — | 5 | 1.2 | 3.6 | 6 | 8.4 | 12 | 24 |
| Drawing workability | | ⊚ | Δ | ○ | ○ | ○ | ○ | ○ | ○ |
| Adhesive characteristics | Initial | ○ | ○ | ○ | ○ | ○ | ○ | ○ | ○ |
| | Damp-heat aging | x | Δ | ○ | ○ | ⊚ | ○ | ○ | ○ |

Figure 2:
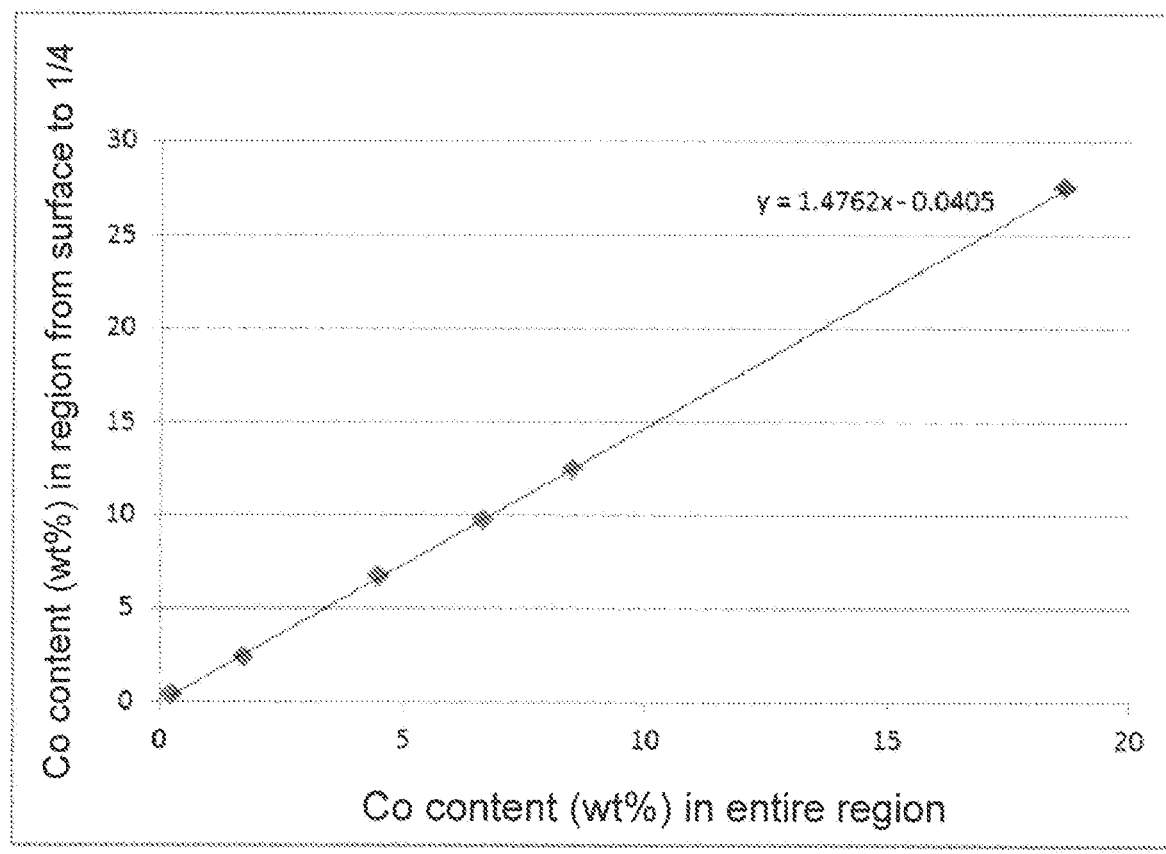
FIG. 2 is a graph showing the Co content in a region from the surface to ¼ of the plating layer in a Co containing product.
Figure 3:
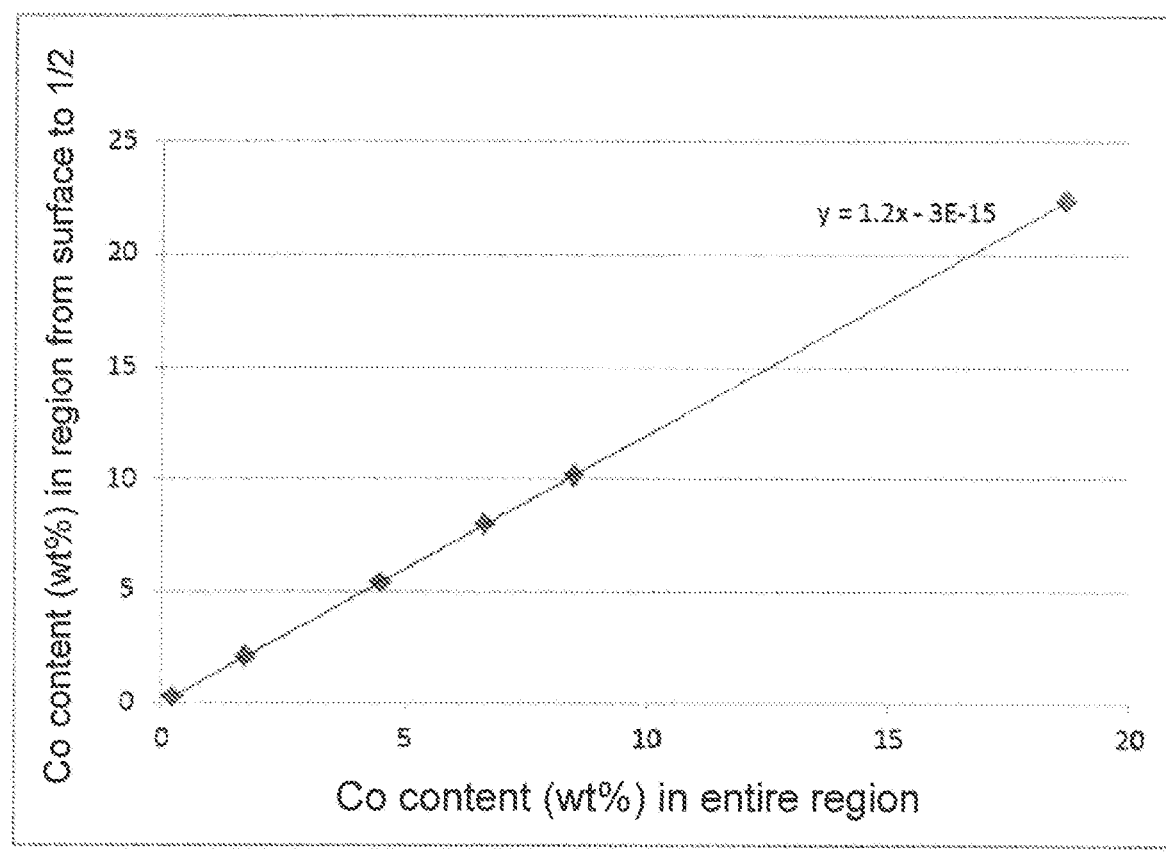
FIG. 3 is a graph showing the Co content in a region from the surface to ½ of the plating layer in a Co containing product.

Drawing Workability and Adhesive Characteristics by Alloy Composition of Plating Layer and Diffusion Heating Process As shown in Table 1 above, in Comparative Example 2 in which only primary diffusion after sequential plating was carried out, the Co concentration was 5%, uniform over the entire region of the plating layer, but Examples 1 to 6 in which diffusion was carried out twice using different induction heating frequencies showed concentration gradients in which the Co contents in the regions from the surface to ¼ and ½ depth of the plating layer were 40% or more and 20% or more compared with the total Co content, respectively.
FIG. 2 is a graph showing the Co content in the region from the surface to ¼ of the plating layer in Examples 1-6, and FIG. 3 is a graph showing the Co content in the region from the surface to ½ of the plating layer in Examples 1-6.

As shown in the measurement results of drawing workability and adhesive characteristics in Table 1, the drawing workability and damp-heat aging adhesion were excellent in Examples 1-6 having concentration gradients rather than when Co was uniformly distributed over the entire region of the plating layer (Comparative Example 2).

In addition, when comparing steel cord products composed of steel wires of ternary alloy plating layers (Examples 1-6) with the general brass plated steel cord (Comparative Example 1), the initial adhesion was similar, but the damp-heat aging adhesion was significantly excellent in the products of the examples, and especially, a greatest improvement effect was shown when the Co content was 5 wt %.

Table 2 below shows the results of measuring the change in steam aging adhesion according to the Co content in rubber when the steel cord of Example 3 (Co 5 wt %) on Table 1 above was embedded in the rubber with a varied Co content in the rubber. The adhesion data were expressed as an index on the basis of the adhesion value of Comparative Example 1 (brass plated steel cord) on Table 1 above.

TABLE 2

| Classification | Co content in rubber (ppm) | Steam aging adhesion index |
|---|---|---|
| A | 1157 | 145 |
| A (Co-free) | 0 | 333 |

TABLE 2-continued

| Classification | Co content in rubber (ppm) | Steam aging adhesion index |
|---|---|---|
| B | 960 | 145 |
| B(Co-free) | 0 | 161 |
| C | 1062 | 206 |
| D | 1195 | 141 |
| E | 1559 | 106 |
| F | 1061 | 250 |
| G | 703 | 195 |
| H | 2094 | 89 |
| I | 1282 | 110 |

Adhesion Index According to Co Content in Rubber

As shown in Table 2 above, as the steam aging adhesion according to the Co content in rubber, the smaller the Co content in the rubber, the greater the adhesion enhancement effect, for the same type of ternary alloy steel cords, and a greater adhesion enhancement effect was shown in the absence of Co for the same kind of rubbers.

Figure 4:
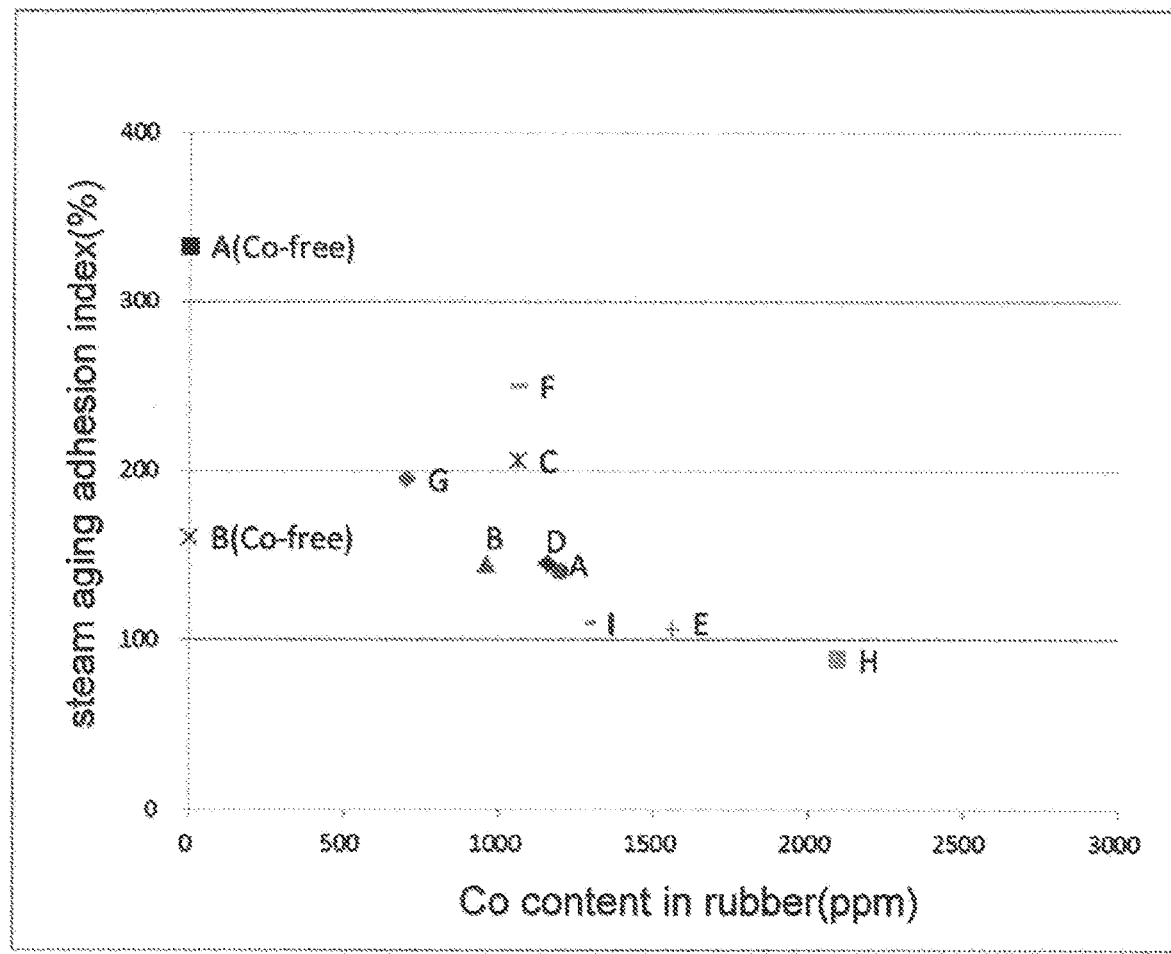
FIG. 4 shows the steam aging adhesion index of the steel cord according to the Co content in rubber.

FIG. 4 is a graph showing the measurement results of Table 2 above. Through the measurement results, the aging of tires can be prevented by varying the Co content and the concentration gradient in steel cord products according to the kind of rubber, and the steel cords formed of ternary alloy plated steel wires can be used to exhibit adhesive characteristics in substitution for a role of the cobalt compound in tire rubber, and it is therefore expected that environmentally preferable tires free of cobalt can be realized.

The invention claimed is:
1. A steel cord for rubber reinforcement, comprising at least one strand of a plated steel wire, wherein the plated steel wire comprises a plating layer of Cu—Co—Zn and has a concentration gradient in which the Co content ratio (Co/(Cu+Zn+Co)) in a region from an outside surface of the plating to ¼ of the plating layer is 40% or more and up to ½ of the plating layer 20% or more compared with the Co content ratio in the entire region of the plating layer, wherein the plating layer of Cu—Co—Zn is a ternary alloy sequentially plated on a surface of a steel wire in the order of Cu→Co→Zn followed by thermal diffusion.

2. The steel cord for rubber reinforcement of claim 1, wherein the total content of Co in the plating layer is 0.5-20 wt %.

3. The steel cord for rubber reinforcement of claim 1, wherein the diameter of the steel wire is 0.1-0.4 mm and the average thickness of the plating layer is 0.1-0.4 μm.

4. A method for manufacturing a steel cord for rubber reinforcement, the method comprising:
  performing sequential plating on a surface of a steel wire in the order of Cu→Co→Zn;
  performing a primary diffusion, for concentration gradient of Co, by subjecting the sequentially plated steel wire to high-frequency induction heating using 1-500 MHz; and
  performing a secondary diffusion, following the primary diffusion, by medium-frequency induction heating using 10-500 KHz;
  wherein the sequentially plated steel wire subjected to the primary diffusion and the secondary diffusion comprises a ternary alloy plating layer of Cu—Co—Zn and has a concentration gradient in which the Co content ratio (Co/(Cu+Zn+Co)) in a region from the an outside surface of the plating to ¼ of the plating layer is 40% or more and up to ½ of the plating layer 20% or more compared with the Co content ratio in the entire region of the plating layer.

* * * * *